Figure 1:
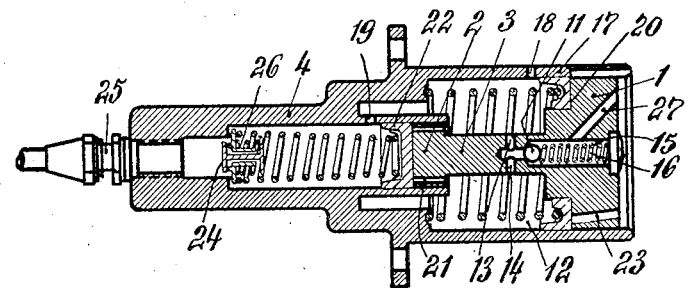

Dec. 27, 1932.  E. ENGEL  1,892,335

HYDRAULIC BRAKE

Filed Nov. 10, 1930    2 Sheets-Sheet 1

Inventor,
Ernst Engel,
By Henry Orth
Atty.

Dec. 27, 1932.  E. ENGEL  1,892,335
HYDRAULIC BRAKE
Filed Nov. 10, 1930    2 Sheets-Sheet 2
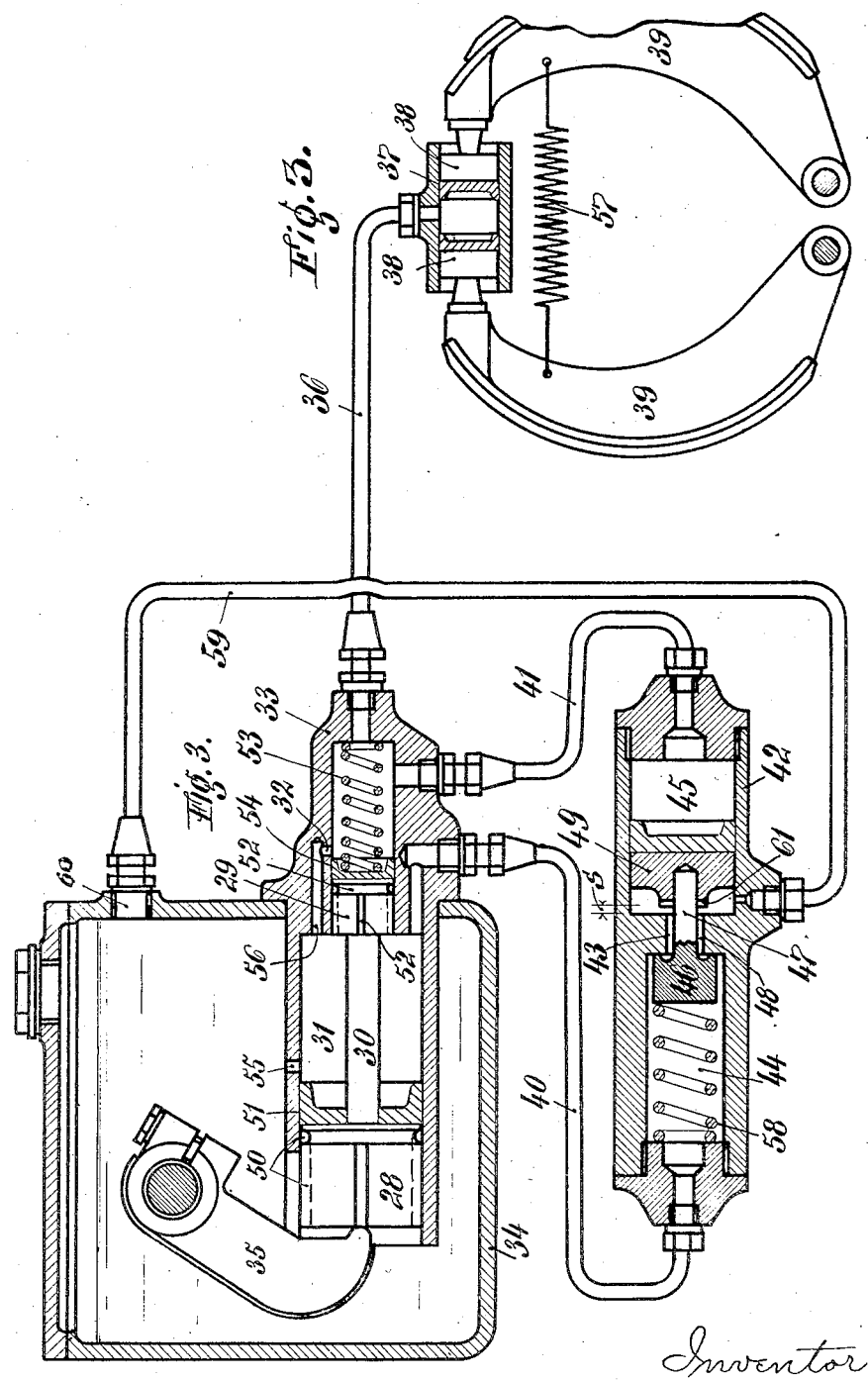

Patented Dec. 27, 1932

1,892,335

UNITED STATES PATENT OFFICE

ERNST ENGEL, OF FRANKFORT-ON-THE-MAIN, GERMANY, ASSIGNOR TO ALFRED TEVES MASCHINEN- UND ARMATUREN-FABRIK GESELLSCHAFT MIT BESCHRANKTER HAFTUNG, OF FRANKFORT-ON-THE-MAIN, GERMANY, A CORPORATION

HYDRAULIC BRAKE

Application filed November 10, 1930, Serial No. 494,765, and in Germany September 21, 1929.

Hydraulic brakes systems are known in which the cylinder, in which pressure is applied to the fluid pressure medium, is provided with a piston of stepped construction such that the larger of the two pistons serves solely for displacing the liquid for overcoming the play of the brake jaws whereas the small piston effects the actual application of the brake subsequent to this operation. In this way the brake action proper can be considerably increased without necessitating a greater path of motion of the pedal or lever by means of which the piston is actuated.

In these known arrangements, if the stepped pistons constitute a connected whole a disadvantage exists in that certain difficulties are involved in the transition from the operation of the one piston, to that of the other, particularly when the cylinder is connected with an equalization device of known type for compensating for the alterations in volume which may occur in the fluid system. Also in this arrangement it is difficult to provide for independence from the wear of the brake lining.

The arrangement according to the present invention avoids these disadvantages in that in the fluid space between the two pistons an excess pressure valve is inserted which automatically controls the transition from the operation of one piston to the other.

Also hydraulic brake systems are known in which the pressure cylinders accommodate two pistons of different diameter of which only the larger piston serves for overcoming the play and bringing the brake into contact without exerting appreciable braking pressure whereas the smaller piston serves only for applying the brake, the action of the larger piston being suspended after the preparation of the brake by passing off the fluid in front of said piston to a fluid reservoir. In the known arrangements a valve is used for passing off this fluid and is controlled mechanically by the motion of the large piston, for example, a cam provided on the piston may operate the valve. This involves directly the disadvantage that the piston must first always be moved to such an extent that the operative position of the cam is attained even if the brakes have already been brought into the ready position. Consequently waste movements occur in the motion of the piston until the small piston commences to operate, the waste motion increasing in accordance with the wear on the brakes. Such waste motions, however, must be avoided in a modern system if it is to satisfy the modern requirements. One important advantage of hydraulic brakes is the avoidance of the use of mechanical elements such as links and bearings which even, when new and certainly after wear, have a certain amount of play or lost motion. The efficiency of an acceptable modern brake system must be extremely high so that it is necessary to avoid the above mentioned lost motion. The known valves have moreover the disadvantage that they are complicated and uncertain in seating which is a disadvantage both from the point of view of economy and also from that of reliability in operation.

All these disadvantages are avoided by a further arrangement according to the present invention, which is such that the valve is opened immediately after the brakes contact so that after the contact the actual braking action is immediately initiated by applying the brakes. It is only in this way that the advantages of separate pistons for bringing the brakes into contact and for applying them are fully realized, as in the first instance the purpose of the large piston is to enable a particularly rapid preparation or bringing into contact of the brakes in order in this way to attain the greatest possible abbreviation of the braking operation and thus of the braking path. It is generally known that this step in the braking process, i. e., the rapid bringing of the brakes into contact, is of decisive importance for the braking effect.

Further the actual operation of the valve is in the second arrangement according to the invention entirely reliable and nevertheless simple because it is effected automatically and positively from the fluid pressure existing in the brake system for bringing the brakes into contact.

Figure 2:
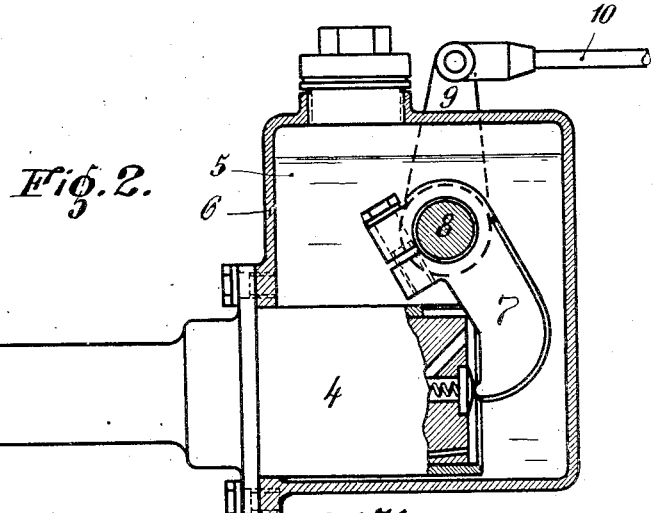

One first embodiment of the invention is represented schematically in the accompanying drawings, in which Fig. 1 is a section longitudinally of the pressure cylinder and Fig. 2 the arrangement of this pressure cylinder in combination with the lever actuating the stepped piston and the reservoir containing the pressure medium.

Figure 4:
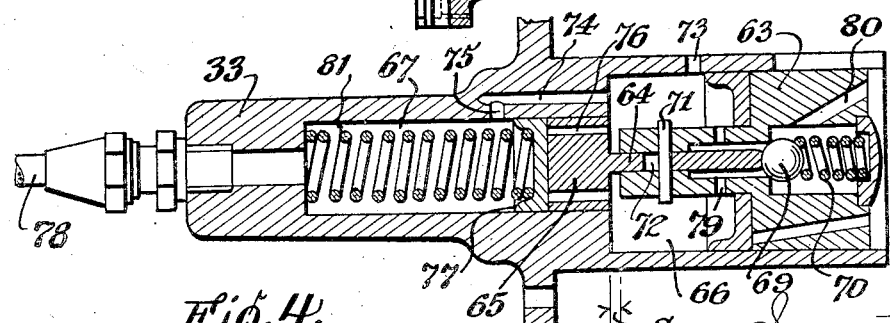

In Figs. 3 and 4 two further embodiments of the arrangement according to the invention are shown by way of example.

According to Figs. 1 and 2 the stepped piston consists of a large piston 1 and a small piston 2 connected by means of a rod 3 to form a united whole. The pistons slide within a cylinder 4 which is inserted in known manner in a reservoir 6 containing the pressure medium 5. The motion of the stepped piston is effected by means of a lever 7 which is operated in the customary manner by means of a pedal or lever by way of shaft 8, lever 9 and link 10.

The excess pressure valve 11 characterizing the invention is shown in the drawings Fig. 1 by way of example as a ball valve disposed in a bore 15 connected with the space 12 intermediate of the two pistons 1 and 2 by means of passages 13 and 14. The valve 11 is retained in position by a spring 16. The invention is not however restricted to this particular disposition of the valve which might equally well be accommodated at any other desired point within the space 12, for example within the wall 17 of the cylinder 4.

The cylinder walls are provided at 18 and 19 with apertures for effecting the compensation of the alterations in volume occurring in the fluid system, which compensation is also effected in known manner by means of the combined valve 24, 26.

The mode of operation of the device according to Figs. 1 and 2 is as follows:

At the beginning of the travel of the stepped piston 1, 2, actuated in the manner set forth above, the sealing sleeve 20 mounted in front of the piston commences to obturate the aperture 18 so that no fluid can be displaced out of the space 12 back into the reservoir 6. The fluid displaced by the piston must therefore seek another outlet and this is provided by the apertures 21 and the yielding sealing sleeve 22 associated with the piston 2. The motion of the piston is repeated until, in known manner, the quantity of fluid requisite for overcoming the play of the brake jaws has been supplied through the valve 24 and pipe system 25 to the cylinders provided at the wheels for applying the brakes. During this operation a flow of fluid from the reservoir 6 into the cylinder space 12 occurs in that as a result of the suctional effect the sealing sleeve 20 is lifted from the cylinder wall during the return stroke of the piston 1 whereupon fluid flows from the reservoir through the bore 23 into the cylinder space 12.

As soon as the brakes are applied the fluid pressure increases and the action of the spring 16 hitherto retaining the excess pressure valve 11 closed is overcome so that liquid is forced back into the reservoir 6 through the valve 11 thus opened and the bore 27. In consequence the piston 1 is rendered inoperative. The fluid pressure in front of the piston 2 or in front of the sealing sleeve 22 is then greater than the pressure of the spring 16 so that the sleeve 22 is no longer able to yield. This sleeve seals off the volume of fluid contained in front of it in the pipe system so that there is no longer a connection between the space 12 and this volume.

When the stepped piston is actuated further the fluid pressure obtaining in the said volume is correspondingly increased in accordance with the force applied to the pedal or lever, the ratio of the lever transmission and the surface of the piston 2.

Fig. 3 represents the next embodiment in which the valve is disposed in a separate housing distinct from the main cylinder and connected with the main cylinder by pipes. This separated construction performs a ready accessibility of the valves which may be of advantage in certain cases.

In Fig. 3, 28 and 29 are the two pistons rigidly interconnected by a rod 30. The piston 28 serving for bringing the brakes into contact moves in the cylinder 31 and the other piston 29 serving for applying the brakes moves in the cylinder 32. Both cylinders constitute a common casting 33 which is disposed in the housing 34. This housing serves at the same time as reservoir for the pressure medium. The pistons are moved by means of lever 35 in otherwise known manner by the application of force in any way. The pressure cylinder is connected by means of a conduit 36 with the brake cylinder 37 in which the pistons 38 operate on the brake jaws 39. Two further conduits 40 and 41 lead to the valve housing 42 which is separated by means of a partition 43 into two bores 44 and 45. The bore 44 contains the valve 46 which is provided with a pin 47 passing through an aperture 48 in said partition 43. The other bore contains a control piston 49 in which the pin 47 of the valve 46 passes. The head of the valve 46 is somewhat smaller than the bore 44 in order to permit of the passage of fluid.

The operation of the arrangement according to Fig. 3 is as follows: At the commencement of the motion of the pistons 28 and 29 the fluid contained in the cylinder 31 and in the conduit 36 is in the first place displaced. The entire brake system is previously filled with fluid in known manner by a pumping effect produced by a reciprocation of the piston whereby the fluid passes first from the reservoir 34 through grooves 50 in piston 28, past the yielding rubber washer 51 and from the cylinder 31 the fluid then passes into the smaller piston 29 and the remaining brake system through corresponding grooves 52 and past rubber washer 54. In addition the cylinders 31 and 32 are connected with the reservoir by passages 55 and 56. This connection furthermore serves the purpose of automatically equalizing out fluid losses occurring in the brake system.

After the passage 55 is covered by the washer 51 the liquid passes during the motion of the piston from the cylinder 31 through grooves 52 into piston 29 and through the conduit 36 into the brake cylinder 37 and here brings the brake jaws into contact by urging the pistons 38 outwardly. In consequence of the large operative surface of the piston 28 and the resulting large displacement of fluid, this bringing of the brake jaws into contact occurs very rapidly and on only small motion of the piston. The fluid pressure occurring thereby is also small as only frictional resistance and the tension of the return spring 57 on the brake jaws have to be overcome.

This fluid pressure obtains also in the bores 44 and 45 of the housing 42 until the brake jaws are brought into contact. As already mentioned above, these bores are of different size for reasons to be mentioned later and thus the surfaces of the valve 46 and of the piston 49 submitted to the fluid pressure are different. As the valve must remain closed during the bringing of the brake jaws into contact, a pressure equalization is requisite in view of this difference in the size of the surfaces on the valve 45 and piston 49. This is effected by means of a spring 58 which exerts on the valve 46 a supplementary pressure corresponding to the difference in surface.

After the brake jaws have been brought into contact the fluid pressure is increased by a small further motion of the piston in order to attain the requisite application pressure for operating the brakes. This increase in pressure is transmitted through the conduits 40 and 41 so that the surfaces of the valve 46 and of the piston 49 are also correspondingly additionally loaded. Now as the operative surface of the piston 49 is greater than that of the valve 46 the increase in pressure on the piston 49 is greater than that on the valve 46 and this results in a motion of the piston 49. The magnitude of this motion corresponds to the play s provided between the partition 43 of the housing and the piston 49. Now as the piston 49 abuts against the pin 47 of the valve, the motion of the piston 49 is also transmitted to the valve 46 so that the valve is raised from its closure seating provided on the partition 43. In consequence of this opening of the valve the fluid contained in the bore 44 can now escape. This escape occurs past the head of the valve through the aperture 48 provided in the partition 43 and the conduit 59 which discharges into the reservoir 34 at 60. In order that the bore should not be obstructed by the piston 49 abutting against the partition 43 a recess 61 is provided on the piston 49.

By the escape of the fluid from the bore 44 of the housing 42, the pressure in the cylinder 31 is also relieved so that after this point no further pressure will be exerted on the washer 54 of the piston 29. Furthermore this washer will be pressed against the walls of the cylinder 32 by the increased pressure in the cylinder 32 so that any connection of the cylinder 32 with the cylinder 31 and the reservoir 34 is interrupted.

As soon as the application of the brakes is discontinued the increased pressure on the control piston 49 is reduced so that the valve 46 closes again under the action of the spring 58. The pistons 28 and 29 are given a return movement by the spring 53 in the small cylinder 32 in addition to the return spring 57. During the return stroke of the pistons the rubber washers 51 and 54 open to relieve suction effect.

The embodiment according to Fig. 4 represents a simplification of the arrangement described above according to Fig. 3 in that a separate housing is not provided for the valve but this is disposed within the housing 33 of the actual pressure cylinder. In this way the conduits for connecting the valve housing with the reservoir are dispensed with.

A further difference of this arrangement from that according to Fig. 3 resides in that in this case the two pistons are not rigidly connected but are relatively movable because the small applying piston is at the same time used as control piston for the valve. Thus in this constructional example the cost of manufacture is reduced by dispensing with these components, so that such an arrangement is of particular advantage when a construction as cheap as possible is desired. Further this arrangement is also advantageous when there is no space available for accommodating the separated arrangement according to Fig. 3.

In the drawings Fig. 4 the large piston 63 has a bore in which is guided the pin 64 of the small piston 65.

The piston 63 moves in the cylinder 66 and the piston 65 in the cylinder 67. As in the embodiment according to Fig. 3 both cylinders are united to a common housing. Further the piston 63 contains the valve 69 in this case constituted of a sphere which is pressed against this seating by a spring 70. The relative motion of the two pistons 63 and 65 is limited on the one hand by the abutment of the piston 65 against the piston 63 and on the other hand by a pin 71 which passes through the shoulder of the piston 63 and the pin 64 of the piston 65. The aperture 72 in the pin 64 requisite for the pin 71 is constructed as an elongated aperture in order to permit of the relative motion of the two pistons. A spring 81 is provided in cylinder 67 for the purpose of returning pistons 63 and 65 to their original position upon the release of the brake. The valve spring 70 must naturally be made sufficiently stronger than spring 81 to prevent opening of the check valve upon initial inward movement.

It is assumed that in this construction also the casting combining the two cylinders 66 and 67 is mounted in a reservoir 34 but this is however not shown in the drawings for the sake of clearness. The fluid connection of the cylinder 66 and 67 with the reservoir is effected through the passages 73, 74 and 75. The operation of this constructional embodiment is as follows:

At the commencement of the motion of the pistons 63 and 65 which are actuated as in the first arrangement by any suitable application of force, the fluid in the cylinder 66 is first displaced through the passages 76 in piston 65 and past the rubber washer 77 which yields before the fluid into the cylinder 67 and from thence into the conduit 78. The brake cylinder is again connected with this conduit. As already mentioned further conduits are in this case not necessary.

After the brake jaws have been brought into contact the piston 65 will be displaced with reference to the piston 63 by the amount of play $s$ in consequence of the increase in pressure on the piston 65. This motion of the piston 65 is transmitted through the pin 64 to the valve 69 so that the latter is raised from its seating.

The resistance of the spring 70 which is to be overcome thereby is comparatively small as the power of this spring has only to correspond to the fluid pressure operating on the sphere during the process of bringing the brake jaws into contact. As soon as the valve is opened the fluid in front of the large piston 63 can escape through passages 79 and 80 into the reservoir. By this escape of the fluid the pressure acting on the rubber washer 77 through the passages 76 is again released. The increased pressure in the cylinder 67 then presses the rubber washer firmly against the walls of the cylinder 67 so that any connection of the cylinder with the cylinder 66 and the reservoir is interrupted.

As soon as the application of the brakes is suspended the increased pressure on the piston 65 is released so that the spring 70 recloses the valve 69. The pistons 63 and 65 are given a return motion by the spring 81 and the small cylinder 67 as well as by the return spring on the brake jaws.

What I claim is:

1. In a hydraulically operated brake system, a cylinder, a brake take-up piston and a co-axial connected brake applying piston, both pistons being accommodated in said cylinder, and an excess pressure valve located in the coaxial connection between said pistons and opening to said cylinder ahead of the brake take-up piston and connecting said cylinder with a sump whereby after the play in the brake has been taken up the brake take-up piston is rendered inoperative.

2. An arrangement according to claim 1 in which the excess pressure valve opens to the cylinder between the two pistons.

3. An arrangement according to claim 1 in which the brake applying piston is provided with bores for permitting displacement from the space between the two pistons of the fluid requisite for taking up the play, and a sealing sleeve disposed in front of the said bores of the brake applying piston adapted to be spaced from the cylinder wall by the fluid passing through said bores from the space between said pistons.

4. In a hydraulic brake system, a large piston for preparing the brakes for application, a small piston for applying the brakes, valve means for rendering the larger piston inoperative during the application of the brakes and a control piston subject to the brake applying pressure for opening said valve means when the brake applying pressure is sufficient to apply the brakes.

5. A hydraulic brake system according to claim 4 in which the surface area of valve means subject to fluid pressure is smaller than that of the control piston.

6. A hydraulic brake system according to claim 4 and in which a fluid reservoir is provided and a separate housing in which the control piston and valve means are disposed and conduits connecting the housing with the fluid in front of the brake applying piston and with the reservoir.

7. A hydraulic brake system according to claim 4 in which the brake applying piston serves as a control piston for operating the valve means.

8. A hydraulic brake system according to claim 4 in which the brake applying piston serves as a control piston for operating the valve means and a lost motion connection between the brake preparing piston and brake applying piston and means operated by relative movement between said pistons for opening said valve means.

In testimony that I claim the foregoing as my invention, I have signed my name.

ERNST ENGEL.